Aug. 12, 1952     S. A. GLICKMAN     2,606,833
PHOTOGRAPHIC FILM WITH ANTIHALATION LAYER
Filed Dec. 23, 1948
Fig. 1.
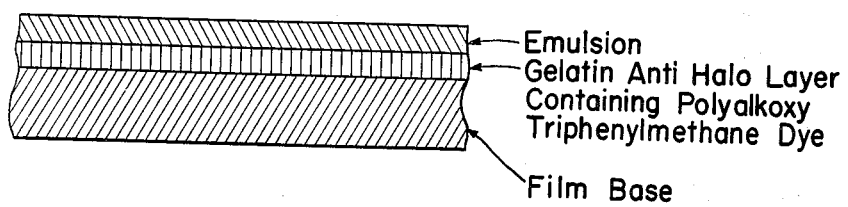
Emulsion
Gelatin Anti Halo Layer Containing Polyalkoxy Triphenylmethane Dye
Film Base
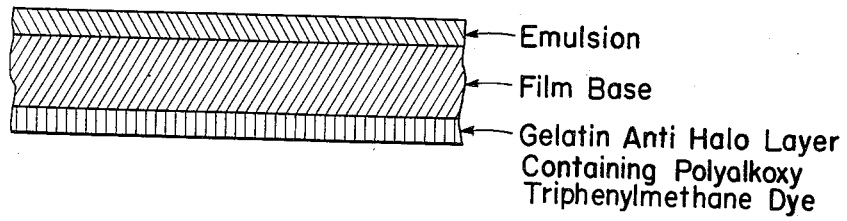
Emulsion
Film Base
Gelatin Anti Halo Layer Containing Polyalkoxy Triphenylmethane Dye
Fig. 2.
Samuel A. Glickman
*INVENTOR.*
BY
*ATTORNEYS*

Patented Aug. 12, 1952

2,606,833

UNITED STATES PATENT OFFICE 2,606,833

PHOTOGRAPHIC FILM WITH
ANTIHALATION LAYER

Samuel A. Glickman, Easton, Pa., assignor to General Aniline & Film Corporation, New York, N. Y., a corporation of Delaware Application December 23, 1948, Serial No. 67,097

5 Claims. (Cl. 95—9)

This invention relates to photographic materials and particularly to antihalation film layers containing dyes used to obtain screening effects with panchromatic film.

Dyes suitable for incorporation in antihalation layers should possess the property of being easily decolorized, remaining colorless, remaining soluble and being capable of dissolving away from said layer in the normal course of the photographic operations of development, fixing and washing. For panchromatic film the antihalation layer should exhibit broad absorption in the red region of the spectrum. Dyes for temporary layers, employing an alkali-soluble resin as a binding agent, should in addition to the above properties display solubility in the lower alcohols or other coating solvents. The dye must of course be photographically free of harmful effects such as desensitization, gradation and sensitization.

While many triphenylmethane dyes are readily bleached by alkaline photographic developers, only certain of the dyes are useful since the colorless forms suffer from the disadvantage of being retained by the gelatin support or layer and are subject to being recolorized in the fixing and washing process or on storage. The triphenylmethane dyes that have been employed for anti-halo purposes usually depend on sulfonic, carboxyl, or other acidic groups for their high solubility and that of the leuco or colorless compounds formed in the course of film development. The presence of these salt forming groups accounts to a large extent for the substantivity that these dyes and their leuco forms display for the gelatin support.

The synthesis of green triphenylmethane dyes with leuco forms possessing a high order of solubility conferred by a number of oxy-ethers of polyoxyethylene chains rather than the conventional sulfonic or carboxyl groups achieved the desirable properties of suitable anti-halo dyes.

These compounds have the following general formula:

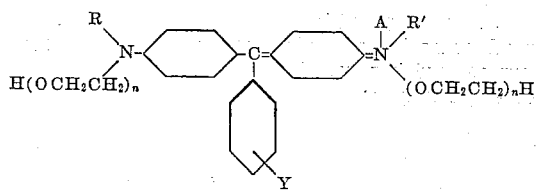

where $n$ is a number from 2 to 10, where Y is a substituent selected from the group consisting of hydrogen, lower alkyl, halogen, nitro, sulfo, carboxy, carbalkoxy and alkoxy, and where A is an anion of a strong mineral acid or an internal linkage where Y is sulfo or carboxy, and where R and R' are selected from the group consisting of lower alkyl (methyl, ethyl, propyl) hydroxyalkyl, and omega hydroxypolyoxaalkyl.

The compounds of the formula above are new compounds, the preparation of which is described in detail in my copending application, Serial No. 65,727, filed December 16, 1948. In general, however, the preparation involves the condensation of the respectively substituted aromatic aldehyde with the respective N,N-disubstituted aniline containing either one or two omega hydroxypolyoxaalkyl groups followed by oxidation in the usual manner with lead dioxide or manganese dioxide. The following are examples of some of the aromatic aldehydes which have been found useful:

Benzaldehyde
Vanillin
m-Tolualdehyde
p-Tolualdehyde
p-Cyanobenzaldehyde
m-Chlorobenzaldehyde
p-Chlorobenzaldehyde
p-Hydroxybenzaldehyde
m-Nitrobenzaldehyde
p-Nitrobenzaldehyde
m-Sulfobenzaldehyde
p-Sulfobenzaldehyde
p-Carboxybenzaldehyde
p-Anisaldehyde
m-Sulfo Anisaldehyde
Piperonal
p-Diethylaminobenzaldehyde Examples of tertiary aromatic amines which may be employed are:

N-methyl-N-(11-hydroxy-3,6,9 - trioxaonadecyl) aniline
N-ethyl-N-(17 - hydroxy - 3,6,9,12,15 - pentaoxaheptadecyl) aniline
14,14'-phenyliminobis-3,6,9,12-tetraoxa-1'-tetradecanol.

The above amines may be obtained from aniline and N-alkylanilines on treatment with ethylene oxide as described in U. S. P. 2,161,322. The compounds so obtained are undoubtedly a mixture whose average composition is given above and are employed as such in the preparation of the dyes.

In the preparation of anti-halation layers the dye is incorporated with various binding agents such as gelatin, alkali-soluble resins etc. in a suitable solvent and cast in a known manner on the back of the support.

Antihalation coatings containing the aforementioned dyes are rapidly decolorized in al-

Example 1

Ten parts of gelatin are dissolved in 90 cc. of water. To this solution are added 10 cc. of a 10% aqueous solution of the green dye having the constitution:

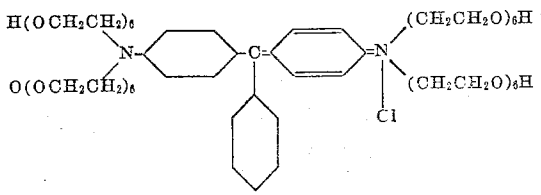

4-[p-bis(17-hydroxy-3,6,9,12,15 - pentaoxaheptadecyl) amino-α-phenylbenzylidene]-2,5-cyclohexadienylidene [bis(17-hydroxy-3,6,9,12,15-pentaoxaheytadecyl)]imonium chloride The solution is coated on the back of a film to form an anti-halo layer. The dye coating thus obtained bleaches rapidly on immersion in photographic developers and is readily discharged from the layer. The layer exhibits broad absorption in the red region of the spectrum.

Example 2

To a solution of 5.0 parts of gelatin in 45 cc. of water are added 5.0 grams of a 10% aqueous solution of the green dye with the structure:

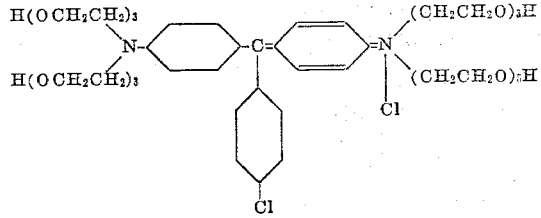

The solution is coated on the back of a film to form an anti-halo layer. The coating displays excellent bleaching and spectral absorption properties.

Example 3

To a solution of 4.0 parts of a hydrolyzed copolymer from vinyl butyl ether and maleic anhydride in 100 parts of 1.3 ethanol-isopropanol are added 1.0 parts of the green dye with the structure:

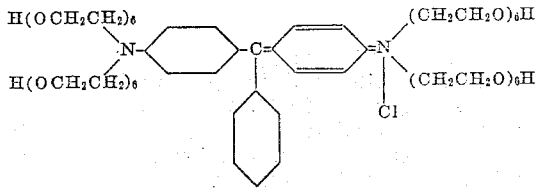

The solution is cast on the back of film to form an anti-halation backing. The temporary layer is very rapidly decolorized and discharged in the alkaline photographic developers.

The plasticizing properties of the dye enable one to formulate the coating solution without any added agents or plasticizers.

Example 4

Ten parts of gelatin are dissolved in 90 parts of water. To this solution are added 10 cc. of a 4% aqueous solution of the green dye having the constitution:

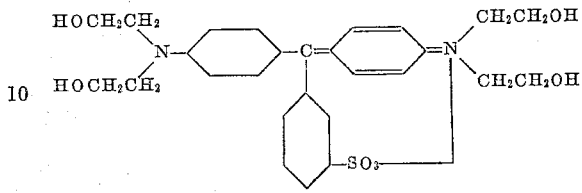

The solution is coated on the back of a film to form an anti-halation layer. The dye is rapidly decolorized and discharged from such layer on treatment with photographic developer.

The film base to which the anti-halation coating is applied is the usual photographic film base of transparent material such as a cellulose organic ester, for example, cellulose acetate or cellulose nitrate or film-forming polymers such as polyvinyl chloride, polyamides and the like. On this film base is coated the gelatin layer which may then be coated with the silver-halide emulsion layers or the anti-halation layer may be on the opposite side of the film from the silver-halide layers. Furthermore, it is possible to use colloids other than gelatin to support the dye such as, for example, water soluble cellulose derivatives including methyl cellulose, hydroxy ethyl cellulose, etc.

In the drawing, Figure 1 illustrates a film base having thereon a gelatin layer containing the antihalation dye of the present invention and a silver halide emulsion layer thereon. Figure 2 illustrates the film base having the emulsion layer on one side and the antihalation layer on the other side thereof.

I claim:

1. A photographic film comprising a film base, a silver halide emulsion, and an anti-halo coating comprising a dye corresponding to the general formula:

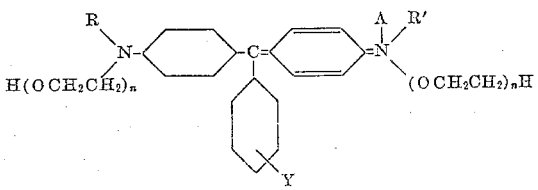

where $n$ is a number from 2 to 10, where Y is a substituent selected from the group consisting of hydrogen, lower alkyl, halogen, nitro, sulfo, carboxy, carbalkoxy and alkoxy, and where A is an anion selected from the group consisting of a strong mineral acid and an internal linkage when Y is an anion of a strong mineral acid, and where R and R' are selected from the group consisting of lower alkyl hydroxyalkyl, and omega hydroxypolyoxaalkyl.

2. A photographic film comprising a film base, a silver halide emulsion, and an anti-halo coating comprising gelatin and a dye corresponding to the formula:

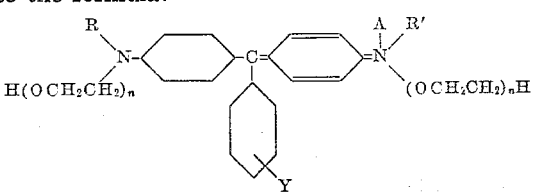

where $n$ is a number from 2 to 10, where Y is a substituent selected from the group consisting of hydrogen, lower alkyl, halogen, nitro, sulfo, carboxy, carbalkoxy and alkoxy, and where A is an anion selected from the group consisting of a strong mineral acid and an internal linkage when Y is an anion of a strong mineral acid, and where R and R' are selected from the group consisting of lower alkyl hydroxyalkyl, and omega hydroxypolyoxaalkyl.

3. A photographic film comprising a film base, a silver halide emulsion, and an anti-halo coating comprising a dye corresponding to the general formula:

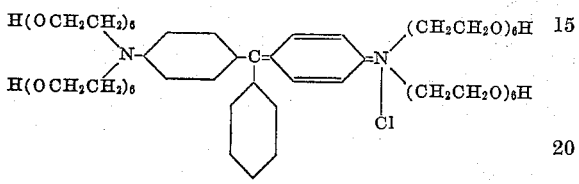

4. A photographic film comprising a film base, a silver halide emulsion, and an anti-halo coating comprising a dye corresponding to the general formula:

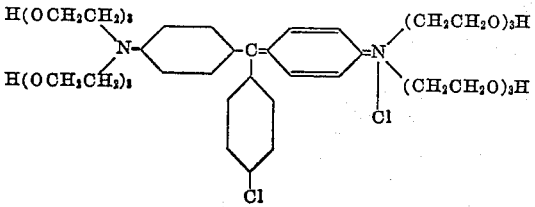

5. A photographic film comprising a film base, a silver halide emulsion, and an anti-halo coating comprising a dye corresponding to the general formula:

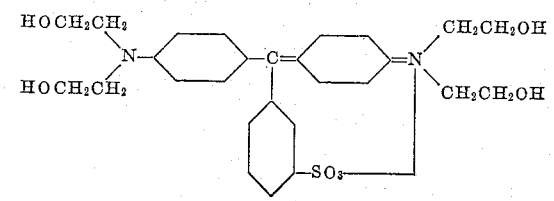

SAMUEL A. GLICKMAN.

REFERENCES CITED

The following references are of record in the file of this patent:

UNITED STATES PATENTS

| Number | Name | Date |
|---|---|---|
| 2,098,891 | Schneider et al. | Nov. 9, 1937 |
| 2,147,112 | Schneider | Feb. 14, 1939 |
| 2,304,890 | Dickey et al. | Dec. 15, 1942 |
| 2,304,946 | McNally et al. | Dec. 15, 1942 |